United States Patent
Hwang et al.

(10) Patent No.: US 10,230,646 B2
(45) Date of Patent: Mar. 12, 2019

(54) METHOD AND APPARATUS FOR TRANSMITTING AND RECEIVING PACKETS IN BROADCAST AND COMMUNICATION SYSTEM

(71) Applicant: Samsung Electronics Co., Ltd., Suwon-si, Gyeonggi-do (KR)

(72) Inventors: Sung-Hee Hwang, Suwon-si (KR); Hyun-Koo Yang, Seoul (KR); Young-Kwon Lim, Goyang-si (KR); Kyung-Mo Park, Seoul (KR); Sung-Oh Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/320,546

(22) PCT Filed: Jun. 22, 2015

(86) PCT No.: PCT/KR2015/006298
§ 371 (c)(1),
(2) Date: Dec. 20, 2016

(87) PCT Pub. No.: WO2015/194919
PCT Pub. Date: Dec. 23, 2015

(65) Prior Publication Data
US 2017/0163373 A1    Jun. 8, 2017

(30) Foreign Application Priority Data
Jun. 20, 2014 (KR) .................. 10-2014-0075757

(51) Int. Cl.
| | |
|---|---|
| *H04L 12/853* | (2013.01) |
| *H04N 19/66* | (2014.01) |
| *H04L 1/00* | (2006.01) |
| *H04L 12/18* | (2006.01) |
| *H04W 88/06* | (2009.01) |
| *H04L 12/927* | (2013.01) |

(52) U.S. Cl.
CPC ........ *H04L 47/2416* (2013.01); *H04L 1/0002* (2013.01); *H04L 1/0033* (2013.01);
(Continued)

(58) Field of Classification Search
CPC ... H04L 1/0002; H04L 1/0033; H04L 1/0041; H04L 1/0045; H04L 1/0057;
(Continued)

(56) References Cited

U.S. PATENT DOCUMENTS

| | | | |
|---|---|---|---|
| 8,787,153 B2 * | 7/2014 | Begen | .................. H04L 1/0009 370/225 |
| 2009/0201805 A1 | 8/2009 | Begen et al. | |

(Continued)

FOREIGN PATENT DOCUMENTS

| | | |
|---|---|---|
| CN | 102334295 A | 1/2012 |
| CN | 103718489 A | 4/2014 |
| WO | 2013/077662 A1 | 5/2013 |

OTHER PUBLICATIONS

Bouras et al., Evaluation RaptorQ FEC over 3GPP multicast services, 2012, IEEE, pp. 257-262.*
(Continued)

*Primary Examiner* — Shelly A Chase
(74) *Attorney, Agent, or Firm* — Jefferson IP Law, LLP

(57) ABSTRACT

The present invention provides a method and an apparatus for transmitting and receiving packets in a broadcast and communication system. The present invention comprises: generating a repair packet by encoding a source packet with an error correction code; and transmitting the source packet to a first network and transmitting the repair packet to a second network, wherein the number of repair packets is determined according to the maximum transmission delay values of the first and second networks.

16 Claims, 14 Drawing Sheets

(52) U.S. Cl.
CPC .......... *H04L 1/0041* (2013.01); *H04L 1/0045* (2013.01); *H04L 1/0057* (2013.01); *H04L 1/0058* (2013.01); *H04L 1/0075* (2013.01); *H04L 12/1868* (2013.01); *H04L 47/801* (2013.01); *H04N 19/66* (2014.11); *H04W 88/06* (2013.01); *H04L 2001/0096* (2013.01)

(58) Field of Classification Search
CPC ..... H04L 1/0061; H04L 1/0064; H04L 12/28; H04L 12/1868; H04L 65/00; H04L 47/10; H04L 47/2416; H04N 47/10; H04N 47/2416; H04N 21/43615; H04N 21/43637; H04N 21/2383; H04N 7/173; H04N 19/66; H04W 88/06
See application file for complete search history.

(56) References Cited

U.S. PATENT DOCUMENTS

| | | | |
|---|---|---|---|
| 2010/0128725 A1* | 5/2010 | daCosta | H03M 13/093 370/389 |
| 2010/0189182 A1 | 7/2010 | Hannuksela | |
| 2010/0223533 A1 | 9/2010 | Stockhammer et al. | |
| 2010/0263007 A1 | 10/2010 | Zhang et al. | |
| 2012/0317461 A1 | 12/2012 | Hwang et al. | |
| 2014/0150014 A1 | 5/2014 | Aitken et al. | |
| 2014/0314158 A1 | 10/2014 | Hwang et al. | |
| 2015/0006991 A1* | 1/2015 | Won | H04N 21/2383 714/755 |

OTHER PUBLICATIONS

Maciej Kurant et al., "Exploiting the Path Propagation Time Differences in Multipath Transmission with EEC", IEEE INFOCOM 2009, The 28th Conference on Computer Communications, Apr. 19, 2009, pp. 2025-2033, XP031468964, Piscataway, NJ, USA.

Ming-Fong Tsai et al., "Multipath Transmission with Forward Error Correction Mechanism for Delay-Sensitive Video Communications", 2010 IEEE 24th International Conference on Advanced Information Networking and Applications Workshops, Apr. 20, 2010, pp. 810-813, XP031687096, Piscataway, NJ, USA.

Chinese Office Action dated Dec. 5, 2018, issued in Chinese Patent Application No. 201580033401.X.

* cited by examiner

METHOD AND APPARATUS FOR TRANSMITTING AND RECEIVING PACKETS IN BROADCAST AND COMMUNICATION SYSTEM

PRIORITY

This application is a National Phase Entry of PCT International Application No. PCT/KR2015/006298, which was filed on Jun. 22, 2015, and claims a priority to Korean Patent Application No. 10-2014-0075757, which was filed on Jun. 20, 2014, the contents of which are incorporated herein by reference.

TECHNICAL FIELD

The present invention relates to a method and apparatus for transmitting and receiving packets using an application layer forward error correction scheme in a broadcast and communication system.

BACKGROUND ART

Diversification of various contents and growth of high-volume contents, such as High Definition (HD) contents and Ultra High Definition (UHD) contents in communication systems are increasingly intensifying data congestion. This situation causes content sent from a sender (e.g., host A) to be abnormally delivered to a receiver (e.g., host B) and some of the content to be lost on a route.

In general, data is transmitted in packets and so, the content loss occurs in packets. The packet is comprised of a block of data for transmission (payload), address information (e.g., sender address, destination address), and control information (e.g., header). Accordingly, if a packet loss occurs in a network, the receiver may not be able to receive the lost packet and thus, may not know of data and control information in the lost packet. This causes various inconveniences to the user, such as deterioration of audio quality, deterioration of video quality or screen freeze, subtitle missing, file loss, etc.

For this reason, to repair the data loss that has occurred in the network, Application Layer Forward Error Correction (AL-FEC) is required, and for this, a method to reconstruct and transmit or receive FEC packets is required.

Meanwhile, as convergence of broadcasting and communication proceeds, multimedia services through various media are becoming common. In other words, the service using the existing broadcasting media, such as terrestrial, satellite, cable, etc., is digitally diversified and at the same time, mobile broadcasting services, such as Digital Multimedia Broadcasting (DMB), Digital Video Broadcasting-Handheld (DVB-H) and Advanced Television Systems Committee-Mobile/Handheld (ATSC-M/H), etc., and convergent services like Internet Protocol TV (IPTV) and smart TV are emerging. Furthermore, preparation for ATSC 3.0 standards is discussed recently, and a need exists for technologies to provide optimal services adaptive to various terminals and varying channel conditions in hybrid network environments of broadcasting network and the Internet.

DISCLOSURE

Technical Problem

An object of the present invention is to provide a method and apparatus for efficiently transmitting packets in a short time when packets are to be transmitted using a plurality of networks in a hybrid network system.

Another object of the present invention is to provide a method and apparatus for reducing transmission delay and reliably transmitting packets when AL-FEC packets are to be transmitted using a plurality of networks in a hybrid network system.

A yet another object of the present invention is to provide a method and apparatus for facilitating quick reproduction of received AL-FEC packets transmitted using a plurality of networks in a hybrid network system.

TECHNICAL SOLUTION

In accordance with an aspect of the present invention, a method for transmitting packets in a broadcast and communication system is provided. The method includes: generating repair packets by encoding source packets with error correction codes, and transmitting the source packets over a first network and transmitting the repair packets over a second network, wherein the number of repair packets is determined according to a maximum transmission delay of the first network.

In accordance with another aspect of the present invention, a method for receiving packets in a broadcast and communication system is provided. The method includes: receiving service signaling, receiving source packets over a first network and receiving repair packets over a second network, and recovering and decoding the source packets using the repair packets, wherein the number of repair packets is determined according to a maximum transmission delay of the first network.

In accordance with another aspect of the present invention, an apparatus for transmitting packets in a broadcast and communication system is provided. The apparatus includes: an error correction encoder for generating repair packets by encoding source packets with error correction codes, a transceiver for transmitting the source packets over a first network and transmitting the repair packets over a second network, and a controller for controlling the error correction encoder and the transceiver, wherein the number of repair packets is determined according to a maximum transmission delay of the first network.

In accordance with another aspect of the present invention, an apparatus for receiving packets in a broadcast and communication system is provided. The apparatus includes: a transceiver for receiving service signaling, receiving source packets over a first network, and receiving repair packets over a second network, and an error correction decoder for recovering and decoding the source packets using the repair packets, wherein the number of repair packets is determined according to a maximum transmission delay of the first network.

MODE FOR INVENTION

Figure 1A:
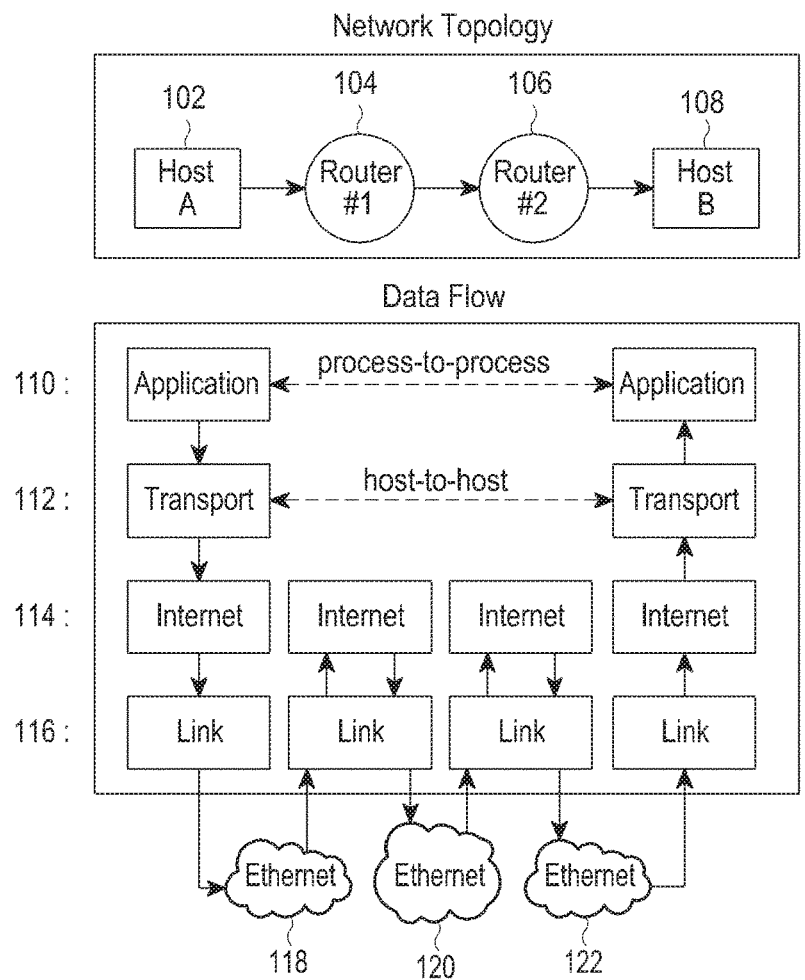
FIGS. 1A and 1B show network topology and data flow.

Embodiments of the present invention will now be described in detail with reference to accompanying drawings to be readily practiced by an ordinary skill in the art. However, the present invention may be implemented in many different forms, and not limited to the embodiments as will be discussed herein.

In the drawings, parts unrelated to the description are omitted for clarity, and like numerals refer to like elements throughout the specification.

The term "include (or including)" or "comprise (or comprising)" is inclusive or open-ended and does not exclude additional, unrecited elements or method steps.

Further, terms, as will be mentioned later, are defined by taking functionalities of the present invention into account, but may vary depending on certain practices or intentions of users or operators. Accordingly, the definition of the terms should be made based on the descriptions throughout this specification.

Although, for convenience of explanation, using an MMT protocol for the transportation and application protocol will be described in the specification, the present invention is not limited thereto, but may be applied even in using other protocols, such as TCP/IP, UDP/IP, HTTP, etc.

The terminology as herein used is summarized in the following table 1.

TABLE 1

| Terminology | description |
|---|---|
| access unit | smallest media data entity to which timing information can be attributed |
| asset | any multimedia data entity that is associated with a unique identifier and that is used for building a multimedia presentation |
| code rate | ratio between the number of source symbols and the number of encoding symbols |
| encoding symbol | unit of data generated by the encoding process |
| encoding symbol block | set of encoding symbols |
| FEC code | algorithm for encoding data such that the encoded data flow is resilient to data loss |

TABLE 1-continued

| Terminology | description |
|---|---|
| FEC encoded flow | logical set of flows that consists of an FEC source flow and one or more associated FEC repair flows |
| FEC payload ID | identifier that identifies the contents of a MMT packet with respect to the MMT FEC scheme |
| FEC repair flow | data flow carrying repair symbols to protect an FEC source flow |
| FEC repair packet | MMT packet along with repair FEC payload identifier to deliver one or more repair symbols of a repair symbol block |
| FEC source flow | flow of MMT packets protected by an MMT FEC scheme |
| FEC source packet | MMT packet along with source FEC payload identifier |
| media fragment unit | fragment of a media processing unit |
| media processing unit | generic container for independently decodable timed or non-timed data that is media codec agnostic |
| MMT entity | software and/or hardware implementation that is compliant to a profile of MMT |
| MMT FEC scheme | forward error correction procedure that defines the additional protocol aspects required to use an FEC scheme in MMT |
| MMT packet | formatted unit of the media data to be delivered using the MMT protocol |
| MMT payload | formatted unit of media data to carry MMT packages and/or signaling messages using either the MMT protocol or an Internet application layer transport protocols (e.g. RTP) |
| MMT protocol | application layer transport protocol for delivering MMT payload over IP networks |
| MMT receiving entity | MMT entity that receives and consumes media data |
| MMT sending entity | MMT entity that sends media data to one or more MMT receiving entities |
| non-timed data | media data that do not have inherent timeline for the decoding and/or presentating of its media content |
| package | logical collection of media data, delivered using MMT |
| repair FEC payload ID | FEC payload ID for repair packets |
| repair symbol | encoding symbol that contains redundancy information for error correction |
| repair symbol block | set of repair symbols which can be used to recover lost source symbols |
| source FEC payload ID | FEC payload ID for source packets |
| source packet block | segmented set of FEC source flow that is to be protected as a single block |
| source symbol | unit of data to be encoded by an FEC encoding process |
| source symbol block | set of source symbols generated from a single source packet block |
| timed data | any data that has inherent timeline information for the decoding and/or presentation of its media contents |

In the following description, the terms 'parity' and 'repair' will be interchangeably used.

Figure 1B:
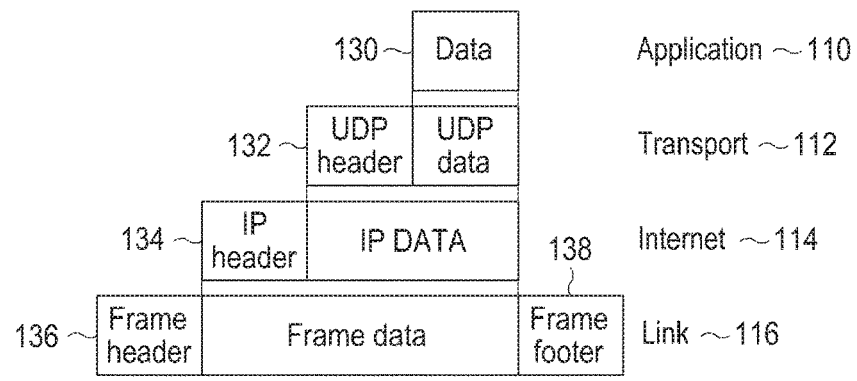

FIGS. 1A and 1B show network topology and data flow.

Referring to FIG. 1A, network topology includes host A 102 operating as a transmitter and host B (108) operating as a receiver, and the host A 102 and host B 108 are connected via one or more routers 104, 106. The host A 102 and host B 108 are connected with the routers 104, 106 over Ethernet 118, 122, and the routers 104, 106 may be connected to each other through optic fiber, satellite communication or possible other means 120. Data flow between the host A 102 and the host B 108 is made through a link layer 116, an Internet layer 114, a transport layer 112, and an application layer 110.

Referring to FIG. 1B, the application layer 130 applies AL-FEC to create data 130 for transmission. The data 130 may be RTP packet data divided based on Real Time Protocol (RTP) from data compressed in an audio/video (AV) codec or MMT packet data based on the MMT protocol. The data 130 is converted by the transport layer 112 into e.g., a UDP packet 132 with a User Datagram Protocol (UDP) header inserted. The Internet layer 114 generates an IP packet 134 by attaching an IP header to the UDP packet 132, and the link layer 116 makes a frame 116 for transmission by attaching a frame header 136 and if needed, a frame footer to the IP packet 134.

Figure 2:
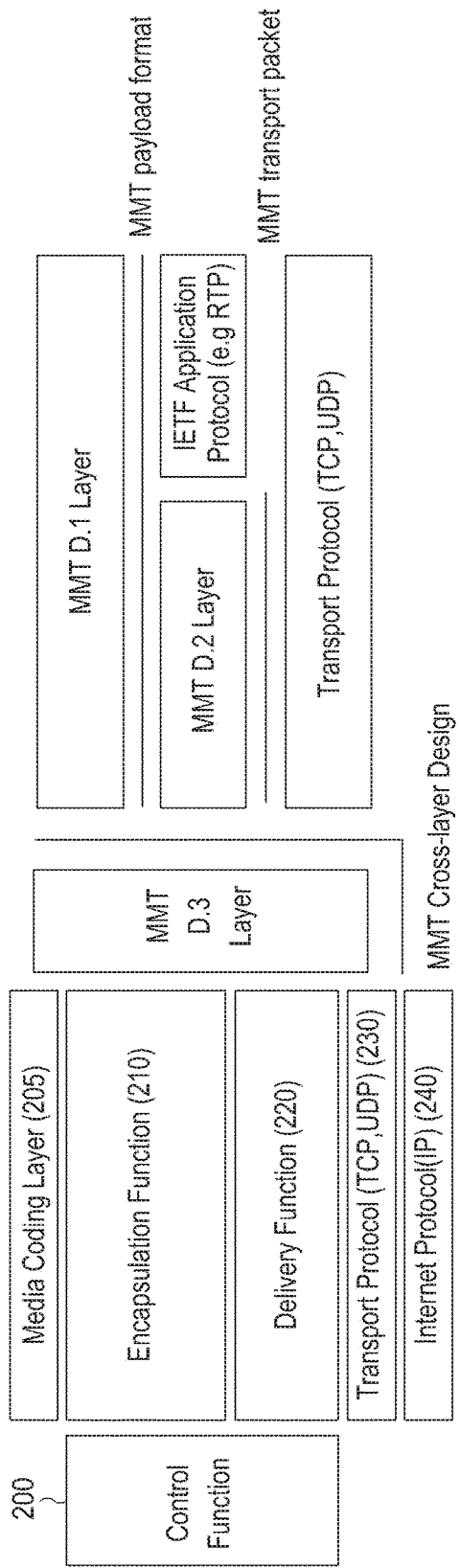
FIG. 2 shows an MPEG Media Transport (MMT) system configuration, according to an embodiment of the present invention.

FIG. 2 shows an MPEG Media Transport (MMT) system configuration, according to an embodiment of the present invention.

An MMT system configuration is represented on the left of FIG. 2, and a detailed structure of delivery function is represented on the right.

A media coding layer 205 compresses and transmits audio and/or video data to an encapsulation function layer (E. Layer) 210.

The encapsulation function layer 210 packetizes the compressed audio/video data in a form similar to a file format and delivers it to the delivery function layer 220.

The delivery function layer 220 or D. Layer makes an output from the encapsulation function layer 210 be in an MMT payload format, and then delivers it to the transport protocol layer 230 in an MMT transport packet format by adding an MMT transport packet header. Alternatively, the delivery function layer 220 delivers the output from the encapsulation function layer 210 to the transport protocol layer 230 in an RTP packet form using the RTP protocol. After this, the transport protocol layer 230 converts it into a transport protocol among the User Datagram Protocol (UDP) and the Transmission Control Protocol (TCP) and sends the result to the IP layer 240. Finally, the IP layer 240 converts the output from the transport protocol layer 230 into IP packets and sends the IP packets using the IP protocol.

The control function layer 200, or C. Layer manages presentation sessions and delivery sessions.

In the meantime, an FEC technology may be applied to aid the receiver to recover data lost in the network. Specifically, a source packet block is comprised of a certain number of data packets having different lengths, which are called source packets, and repair information such as parity data or repair packets may be added to the source packet block through FEC encoding. If there is data lost in the receiver, decoding may be performed using the repair information.

Figure 3:
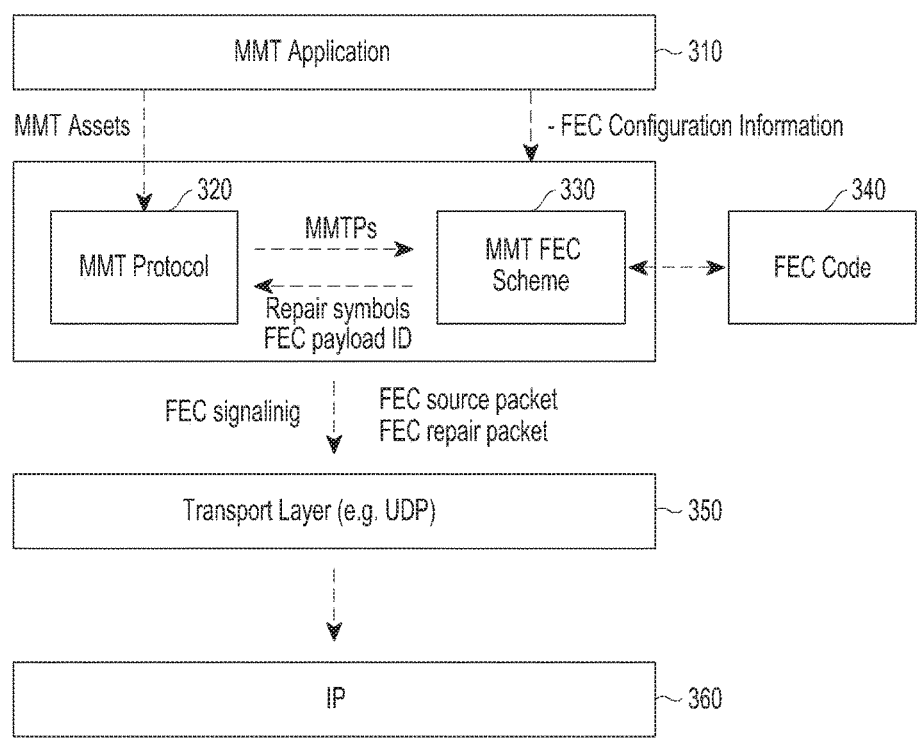
FIG. 3 shows an Application Layer FEC (AL-FEC) architecture in an MMT system, according to an embodiment of the present invention.

FIG. 3 shows an Application Layer FEC (AL-FEC) architecture in an MMT system, according to an embodiment of the present invention.

An MMT application 310 determines MMT assets with AL-FEC protection and inputs them to an MMT protocol 320. Furthermore, the MMT application 310 inputs AL-FEC related configuration information (FEC configuration information) to an MMT FEC scheme 330. The MMT protocol 320 packetizes the input assets into MMT payloads (MMTPs), generates source packets by adding an MMT packet header, and inputs them to the MMT FEC scheme 340 in a source packet block unit having a predetermined number of source packets. The MMT FEC scheme 340 generates a source symbol block from each of the input source packet blocks according to a given source symbol block generation method based on the FEC configuration information input from the MMT application 310. In this case, the source symbol block generation method in accordance with an embodiment of the present invention is given in the FEC configuration information, and the MMT FEC scheme 330 generates the source symbol block in accordance with an embodiment of the present invention if the source symbol block generation method in accordance with an embodiment of the present invention is explicit in the FEC configuration information. The MMT FEC scheme 330 generating the source symbol block inputs it to an FEC code 340, which in turn generates a parity (repair) symbol block from the input source symbol block and input the parity (repair) symbol block to the MMT FEC scheme 330. The MMT FEC scheme 330 generates FEC payload IDs for the source symbol block and the parity (repair) symbol block, and inputs the parity (repair) symbols received from the FEC code 340 to the MMT protocol 320. Using the input parity (repair) symbols and FEC payload IDs, the MMT protocol 320 generates an FEC source packet by adding a source FEC payload ID to the source packet and generates an FEC repair packet by adding a repair FEC payload ID and further an MMT payload header and an MMT packet header to the parity (repair) symbol, and then sends the packets to an IP 360 via the transport layer 350, such as the User Datagram Protocol (UDP). It has thus far been described that the FEC source packet and the FEC parity (repair) packet are generated in source packet blocks, for convenience of explanation, but in actual network environments, the MMT protocol 320 inputs the generated source packet to the MMT FEC scheme 330 and if needed, allocates a source FEC payload ID to generate and send an FEC source packet directly, and the MMT FEC scheme 330 stores the source packet in its internal memory and generates a source symbol block from the source packet block as soon as receiving a final source packet for the source packet block, and the FEC code 340 generates a parity symbol block and inputs the generated parity symbol block to the MMT protocol 320 with the FEC payload ID to generate and send FEC parity (repair) packets.

In embodiments of the present invention, when an FEC packet is to be transmitted in a hybrid network environment, a scheme to increase transmission efficiency and decoding efficiency by transmitting the source packet and the repair packet over different networks.

FIGS. 4A to 4E are exemplary protocol stacks of a hybrid network environment, according to embodiments of the present disclosure.

Figure 4A:
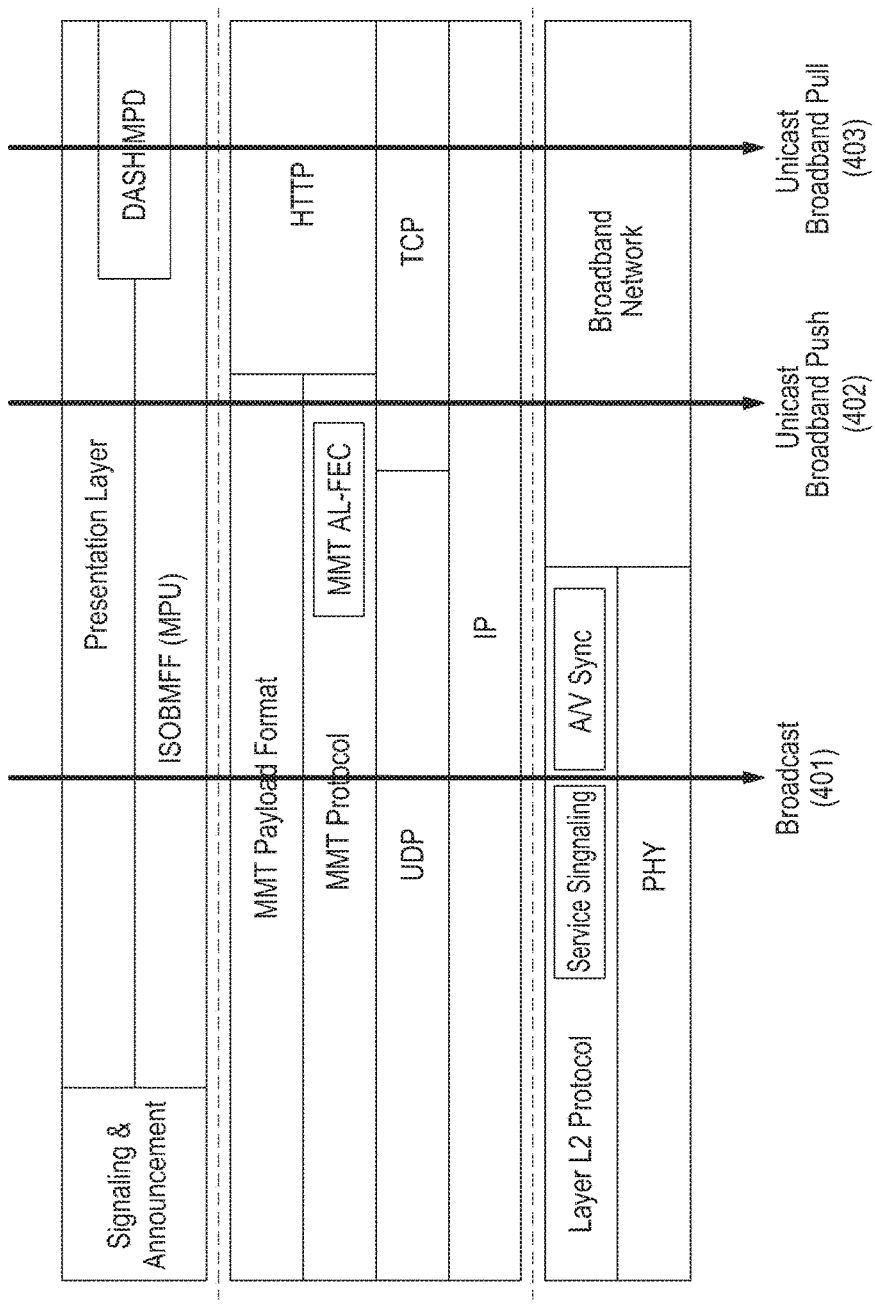
FIGS. 4A to 4E are exemplary protocol stacks of a hybrid network environment, according to embodiments of the present disclosure.

In FIG. 4A, 401 represents a path to transmit a packet, to which the MMT protocol and AL-FEC are applied, over a broadcasting network based on an UDP/IP transfer protocol, 402 represents a path to transmit a packet in a push form, to which the MMT protocol and AL-FEC are applied, over a broadband network based on a TCP/IP transfer protocol, and 403 represents a path to transmit an HTTP packet in a pull form over a broadband network based on a TCP/IP transfer protocol.

Figure 4B:
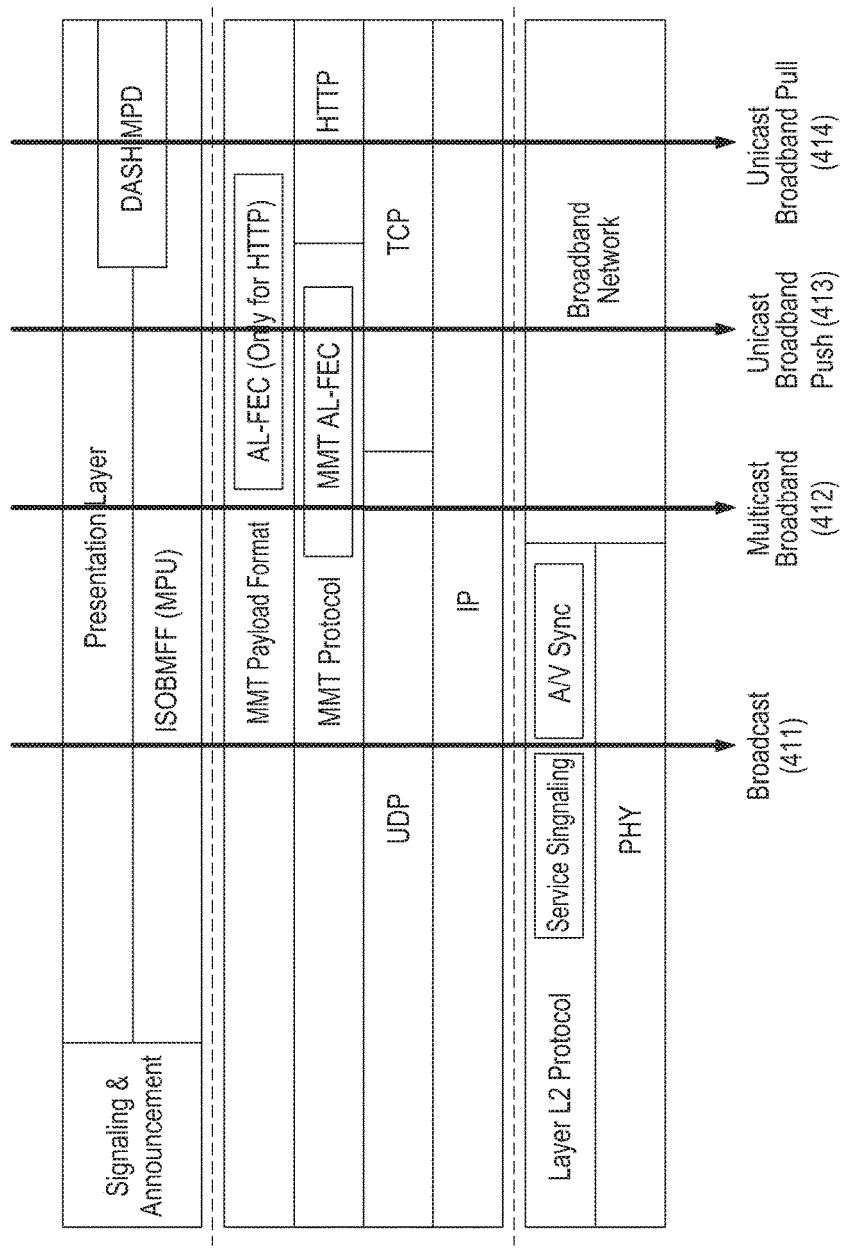

In FIG. 4B, 411 represents a path to transmit a packet, to which the MMT protocol and AL-FEC are applied, over a broadcasting network based on an UDP/IP transfer protocol, 412 represents a path to transmit a packet, to which the MMT protocol and AL-FEC are applied, over a broadband network based on a UDP/IP transfer protocol, and 413 represents a path to transmit a packet in a push form, to which the MMT protocol and AL-FEC are applied, over a broadband network based on a TCP/IP transfer protocol, and 414 represents a path to transmit an HTTP packet, to which AL-FEC is applied, in a pull form over a broadband network based on a TCP/IP transfer protocol.

Figure 4C:
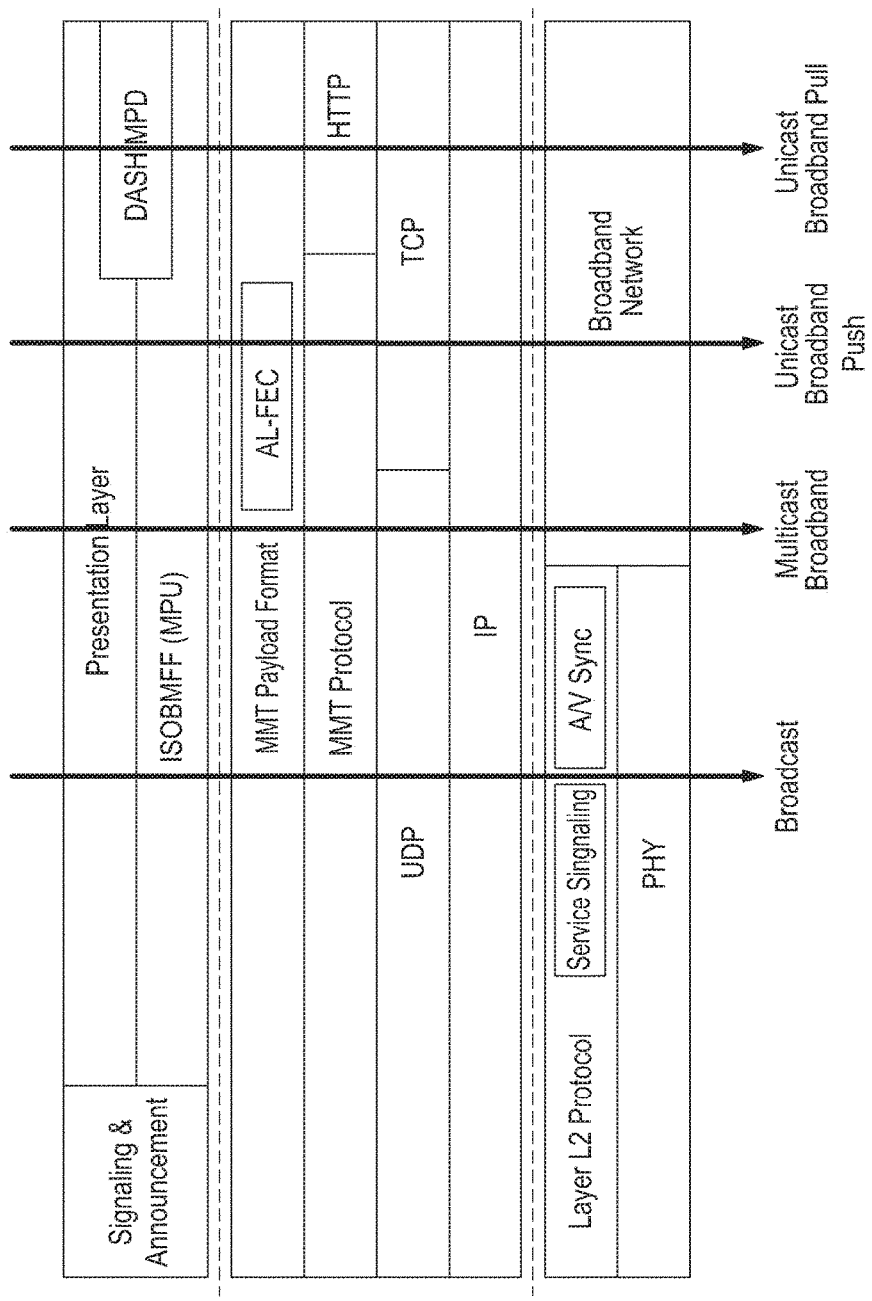

FIG. 4C is the same as FIG. 4B except that AL-FEC is applied to an MMT payload format instead of an MMT protocol.

Figure 4D:
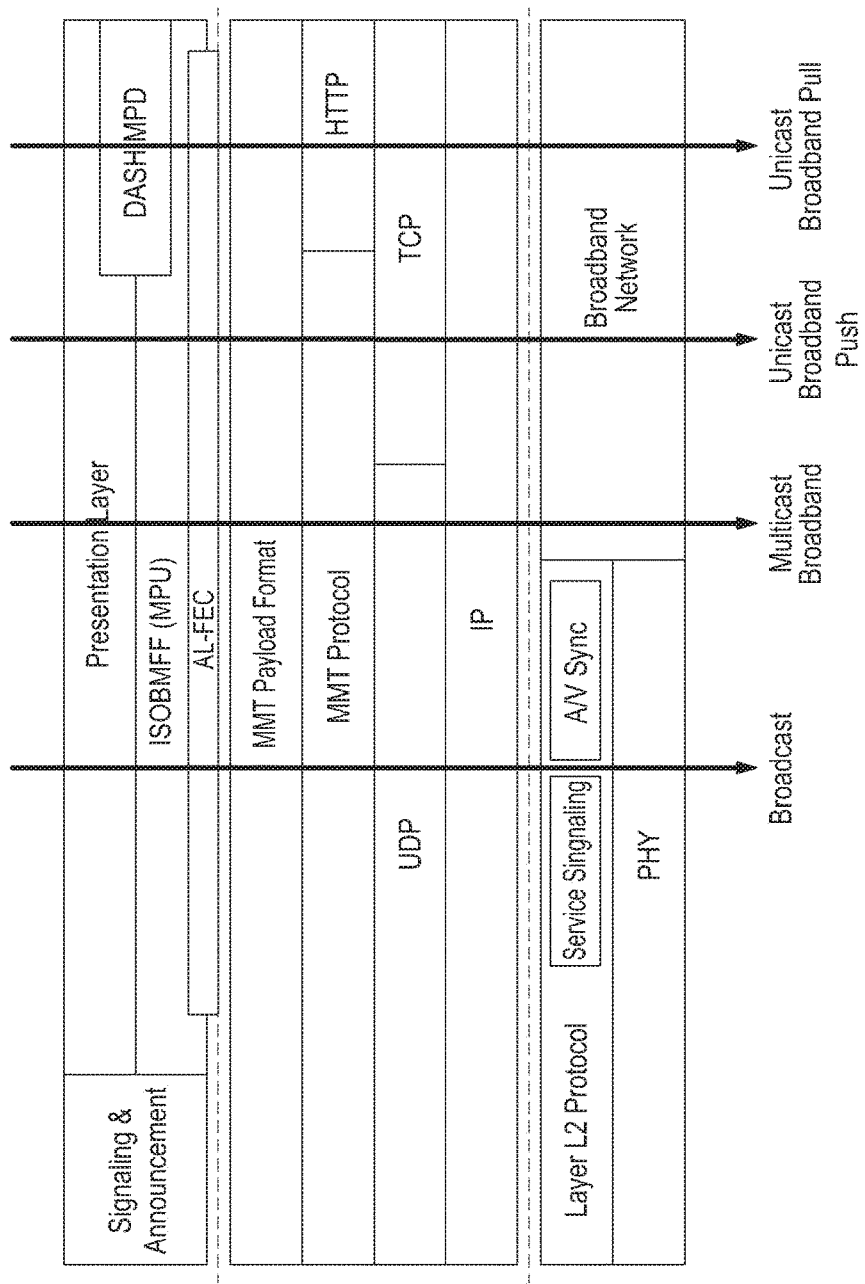

FIG. 4D is the same as FIG. 4C except that AL-FEC is applied to an MPU instead of an MMT payload format.

Figure 4E:
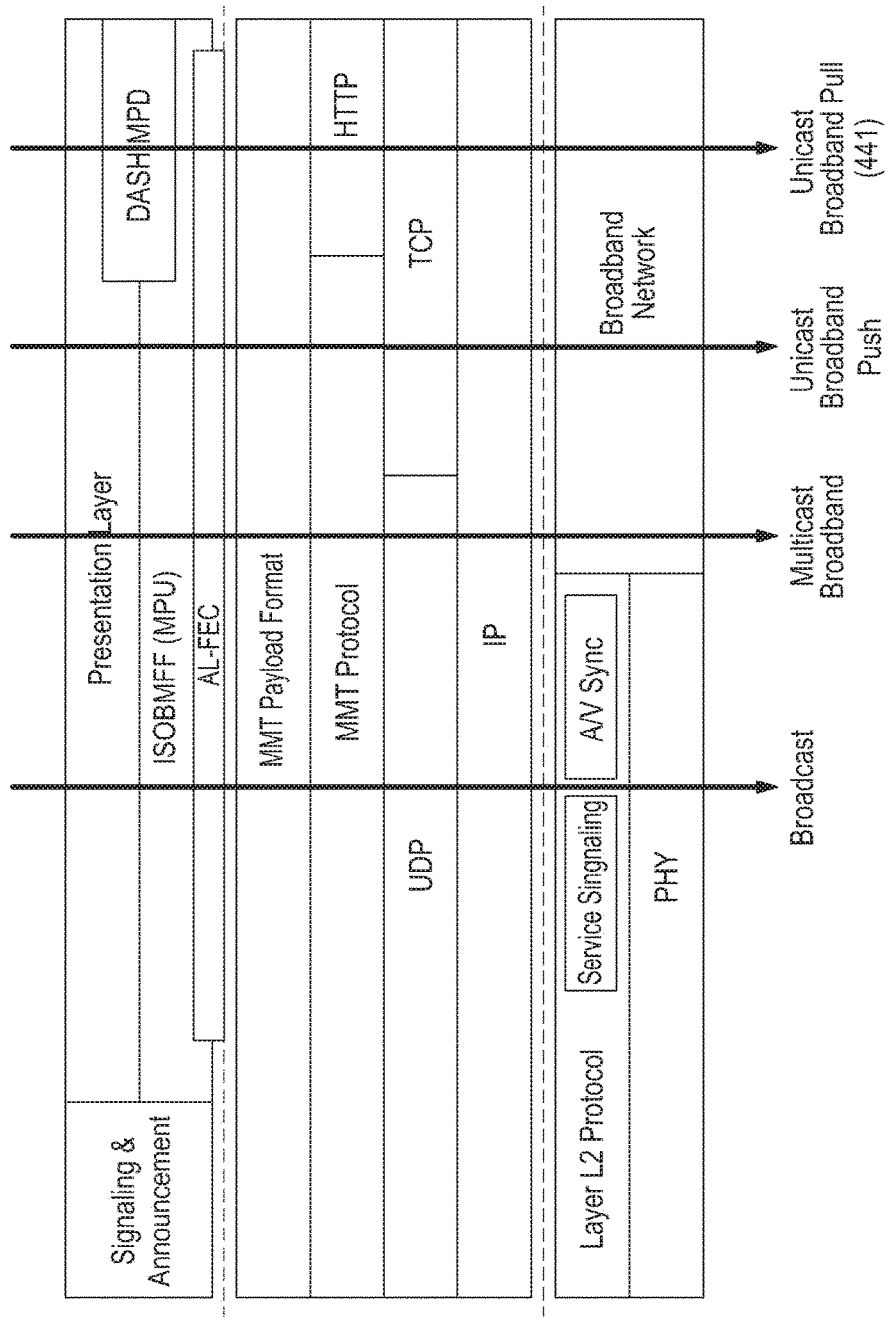

FIG. 4E is the same as FIG. 4D except that HTTP is applied instead of an MMT payload format in a packet transmitted in a path 441.

Figure 5:
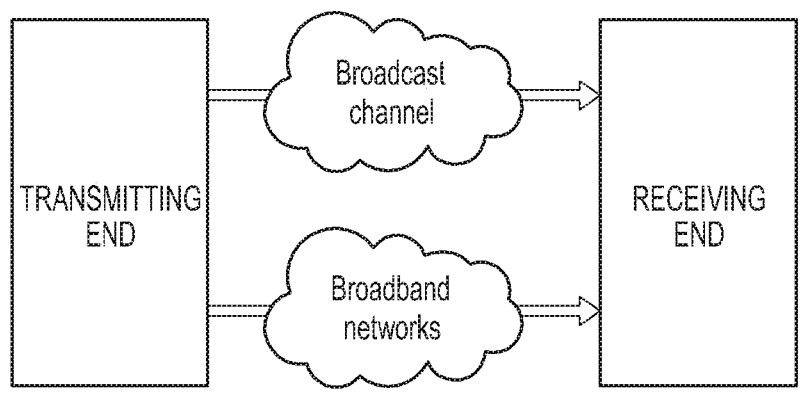
FIG. 5 shows an example of transmitting FEC packets using two networks in a hybrid network environment, according to an embodiment of the present invention.

FIG. 5 shows an example of transmitting FEC packets using two networks in a hybrid network environment, according to an embodiment of the present invention.

In FIG. 5, assume that when Video 1, Audio 1, and Audio 2 are served, the Video 1 and Audio 1 are served from a broadcast transmitting tower over a broadcasting network, and the Audio 2 is served from a broadband server over a broadband network. The present invention is not, however, limited thereto, and data may be transmitted over any of the broadcasting network and the broadband network, which may be determined in advance or be informed to a terminal in advance. Furthermore, in FIG. 5, it is assumed that AL-FEC is applied to the Audio 2. Accordingly, source packets and repair packets for the Audio 2 are generated at a transmitter end.

Meanwhile, the broadcasting network has relatively small delay and small data loss ratio as compared to the broadband network, and the broadband network has relatively large delay and large data loss ratio. Accordingly, in an embodiment of the present disclosure, in a case of transmitting packets for the Audio 2, the source packet is transmitted over the broadband network at the user's request while the repair packet is transmitted over a broadcasting network different from the network over which the source packet is transmitted.

For example, if the maximum transmission delay in the broadband network is 5 seconds and the maximum transmission delay of the broadcasting network is 2 seconds, the receiver receives source packets in 5 seconds, which is the maximum transmission delay of the broadband network, and recovers source packets that have not been received in 5 seconds using the repair packets received over the broadcasting network. Since the maximum transmission delay of the broadcasting network over which the repair packets are transmitted is 2 seconds, the repair packets have already been completely received before all the source packets are received. Accordingly, the receiver may not wait until 5 seconds, which is the maximum transmission delay of the broadband network, but regard that source packets that have not yet been received until completion of repair packet reception are lost, and recover the lost source packets using the received repair packets.

For example, in a case of transmitting data of the Audio 2 accounting for 1 second, if 90% of the data arrives in 2 seconds from the start of the transmission and the remaining 10% arrives in 2 to 5 seconds from the start of the transmission, when the maximum transmission delay for the Audio 2 is set to 2 seconds, which is equal to the maximum transmission delay of the broadcasting network, and repair packets for the Audio 2 are to be generated, as many repair packets as to recover the 10% of source packets that have not yet arrived may be generated and transmitted over the broadcasting network. The receiver then receives 90% of the source packets over the broadband network for 2 seconds and receives all repair packets over the broadcasting network. The 10% of source packets that have not yet been received after the lapse of 2 seconds may be recovered using the already received repair packets, and thus, data may be decoded and played 2 seconds later. As such, if the repair packets and the source packets are transmitted over different networks, the number of the repair packets and the maximum transmission delay of the source packets need to be appropriately set by taking into account the network environments.

An exemplary method and operation to set the maximum transmission delay in the broadband network and the number of repair packets at a transmitter end will now be described in detail.

In a case that 10-second data of Audio 2 comprised of 1,000 packets and 1-second data of Audio 2 comprised of 100 packets are to be transmitted over the broadband network, if the number of packets that arrive in 2 seconds from the start of the transmission of the 1-second 100 packets is 80 on average, and the number of packets that arrive in 3 seconds is 90 on average and 80 at the least, the maximum transmission delay of the Audio 2 is set to 2 seconds in an HRBM message and FEC Protection Window time of the Audio 2 is set to 1 in an AL-FEC message. Furthermore, in order to correct a few 20 packets (i.e., the maximum number of source packets that do not arrive in 3 seconds equal to the maximum transmission delay+FEC protection window) given that the 1-second 100 packets are deemed source packets, the number of repair packets is determined based on a given error correction codes and the repair packets are generated. The HRBM message, source packets, and repair packets are then transmitted.

If the given error correction codes are optimal codes like RS codes, 20 repair packets may be generated from the 100 source packets. If other codes than the optimal codes (e.g., LDPC, RaptorQ, etc.) are used for the error correction codes, more than 20 of repair packets need to be generated. Given that the broadcasting network is not lossy in the application layer due to the error correction codes in the physical layer, if a loss occurs in the application layer of the broadcasting network, more repair packets should be generated taking into account the loss ratio of when the repair packets are to be transmitted over the broadcasting network.

Furthermore, configuration information relating to AL-FEC applied to the Audio 2 is included in the AL-FEC message and transmitted over the broadcasting network, and maximum transmission delay information (max_transmission_delay) for the source packet and the repair packet of the Audio 2 may be transmitted in the hypothetical receiver buffer model (HRBM) message. The HRBM message acts as sending information about a transmission delay between the transmitter and receiver ends and memory requirements to the receiver end for efficient operation in a broadcasting environment.

Figure 6A:
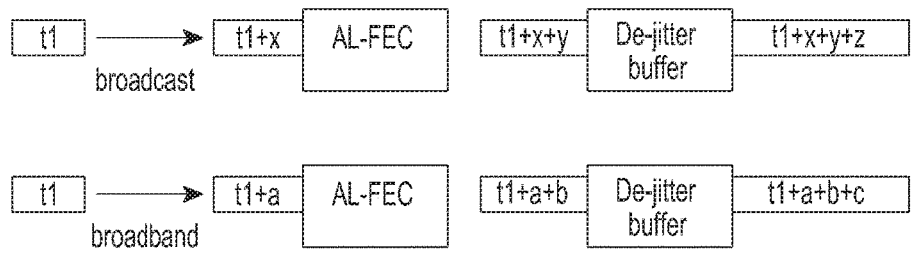
FIGS. 6A and 6B show exemplary operations of a hypothetical receiver buffer model (HRBM) in a hybrid network environment.
Figure 6B:
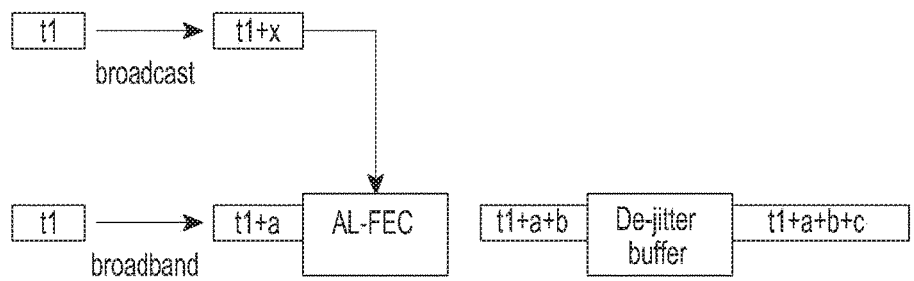

FIGS. 6A and 6B show exemplary operations of a hypothetical receiver buffer model (HRBM) in a hybrid network environment.

Referring to FIG. 6A, an MMT layer of a transmitter end transmits packets over a broadcast network and a broadband network in time t1. The respective packets then arrive at AL-FEC buffers of the respective receiver ends in time t1+x, t1+a due to network delays of the broadcast network and the broadband network (x for broadcast network, a for broadband network, and x and a may not be different for each packet). In the AL-FEC buffers of the respective receiver ends, FEC decoding is performed to output packets to the respective de-jitter buffers in time t1+x+y, t1+a+b, and eliminates jitters through the respective de jitter buffers in time t1+x+y+z, t1+a+b+c. Here, z represents waiting time in the de jitter buffer of the broadcasting network, and c represents waiting time in the de jitter buffer of the broadband network, where z and c may be different for each packet. x+y+z is a value obtained by adding an FEC protection window value to a maximum transmission delay of an HRBM message for a broadcast network, and a+b+c is a value obtained by adding the FEC protection window value to the maximum transmission delay of an HRBM message for a broadband network. In FIG. 6A, only when x+y+z=a+b+c, the packet transmitted over the broadband network and the packet transmitted over the broadcast network may be synchronized.

Referring to FIG. 6B, the repair packet and the source packet are transmitted over the broadband network and the broadcast network, respectively, in time t1. The repair packet and the source packet then arrive at AL-FEC buffers of the respective receiver ends in time t1+x, t1+a, respectively, due to network delays of the broadcast network and the broadband network (x for broadcast network, a for broadband network, and x and a may be different for each packet). The AL-FEC buffers of the receiver ends receive source packets and repair packets in a period of time determined by considering the maximum transmission delay of the source packet (maximum transmission delay of an HRBM message) and FEC protection window time determined in accordance with an embodiment of the present disclosure, and recover the source packet and eliminate jitters through the de jitter buffer.

Figure 7A:
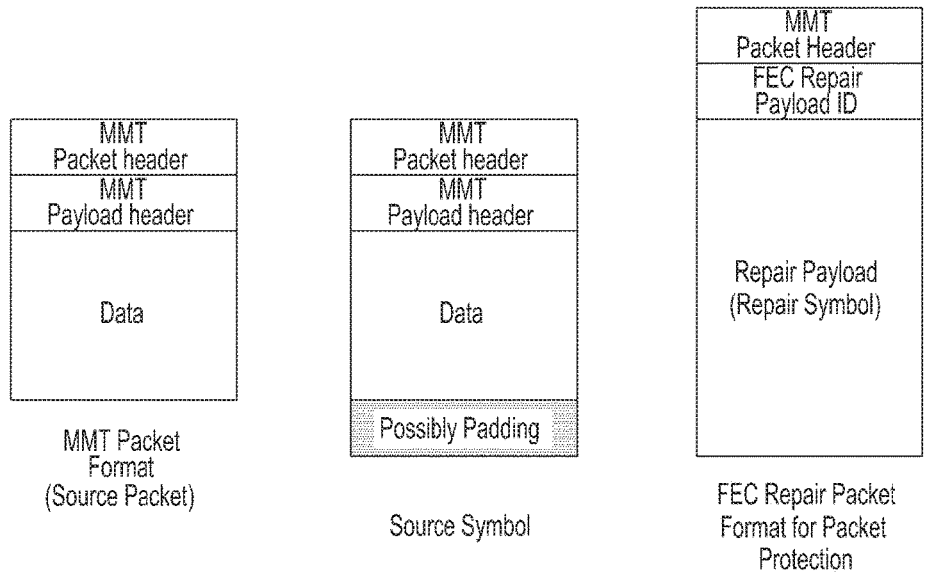
FIGS. 7A to 7C show repair packet formats for packet protection, according to embodiments of the present disclosure.
Figure 7B:
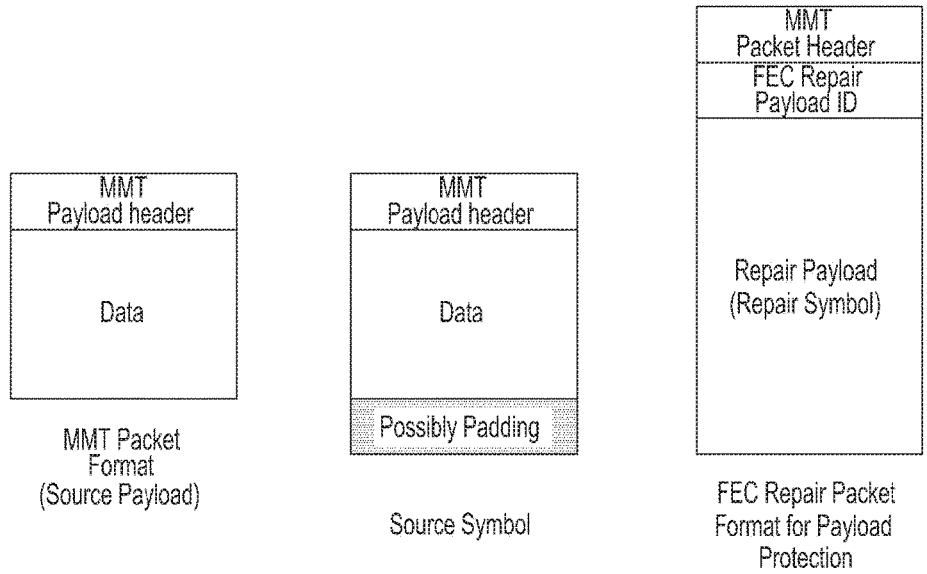
Figure 7C:
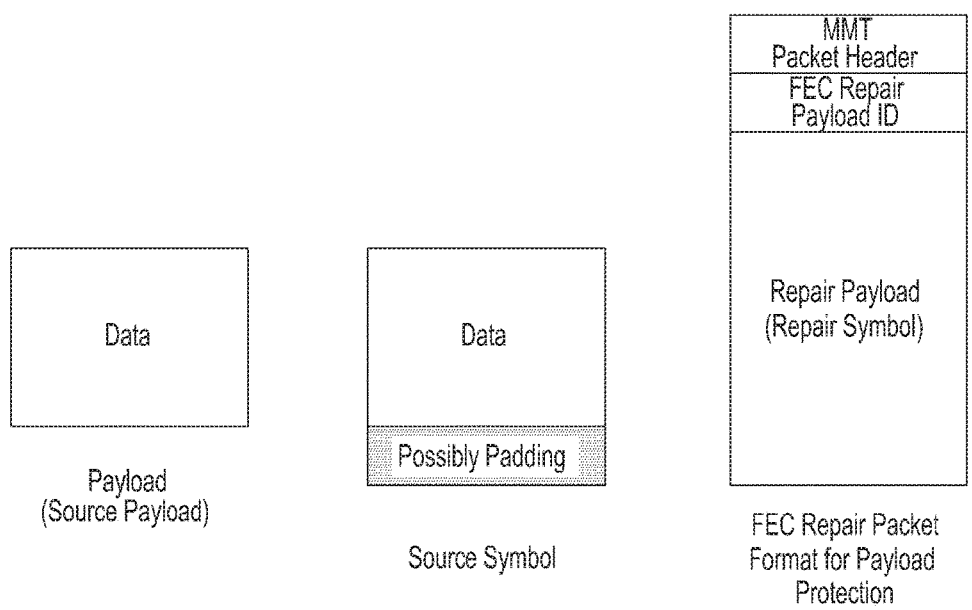

FIGS. 7A to 7C show repair packet formats for packet protection, according to embodiments of the present disclosure.

Referring to FIG. 7A, Source Packet (=MMTP Packet) includes MMT Packet Header, MMT Payload Header, Payload (Data). A source symbol is generated by adding possible padding to a source packet, in which case as much padding data (all are 00H) as given in the AL-FEC message or as difference from a predetermined size of repair symbol is added. An FEC repair packet includes MMT packet header, FEC repair payload ID, and repair symbol generated by FEC encoding from the source symbol block.

Referring to FIG. 7B, source payload (=MMT payload) includes MMT payload header and payload (data). A source symbol is generated by adding possible padding to a source payload, in which case as much padding data (all are 00H) as given in the AL-FEC message or as difference from a predetermined size of repair symbol is added. An FEC repair packet includes MMT packet header, FEC repair payload ID, and repair symbol generated by FEC encoding from the source symbol block.

Referring to FIG. 7C, source payload (=MMT payload) includes payload (data). A source symbol is generated by adding possible padding to a source payload, in which case as much padding data (all are 00H) as given in the AL-FEC message or as difference from a predetermined size of repair symbol is added. An FEC repair packet includes MMT packet header, FEC repair payload ID, and repair symbol generated by FEC encoding from the source symbol block.

Figure 8:
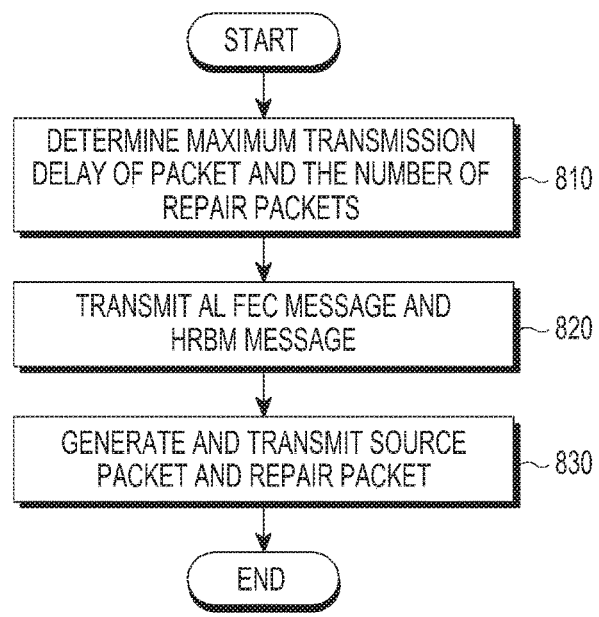
FIG. 8 shows a packet transmission procedure at a transmitter end, according to an embodiment of the present disclosure.

FIG. 8 shows a packet transmission procedure at a transmitter end, according to an embodiment of the present disclosure.

Referring to FIG. 8, the transmitter end first determines the maximum transmission delays for source packet and repair packet of data for transmission and the number of repair packets based on conditions of networks over which the packets are to be transmitted, in 810, and transmits AL FEC message and HRBM message including the determined information to the receiver end, in 820. It then generates source packets and repair packets of data for transmission and transmits them over a broadband network and a broadcasting network, respectively.

Figure 9:
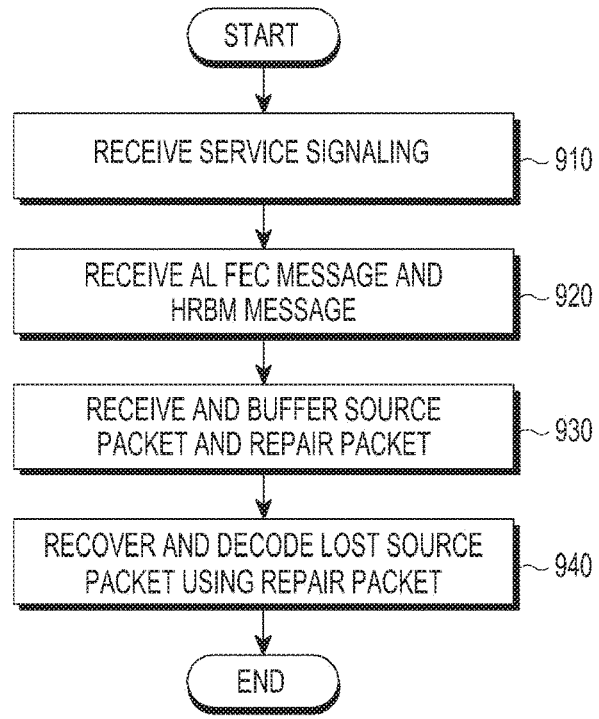
FIG. 9 shows a packet reception procedure at a receiver end, according to an embodiment of the present disclosure.

FIG. 9 shows a packet reception procedure at a receiver end, according to an embodiment of the present disclosure.

Referring to FIG. 9, a receiver end receives service signaling or announcement, and recognizes that Video 1, Audio 1, and Audio 2 are served from the transmitter end through the service signaling or announcement, in 910. It may also receive an AL-FEC message and an HRBM message, and obtain FEC configuration information and maximum transmission delay information for the Video 1, Audio 1, and Audio 2, in 920. The receiver end receives and buffers source packets of the Audio 2 over a broadband network, and at the same time, receives and buffers repair packets of the Audio 2 over a broadcast network, in 930. The receiver end receives source packets and repair packets for a corresponding period of time based on the maximum transmission delays for the source packet and the repair packet of the Audio 2 obtained in advance through the HRBM message, and regards that source packets that have not been received in the corresponding period of time are lost. Using the repair packets that have been completely received, it recovers the lost source packets and then decodes the recovered Audio 2 packets, in 940.

A decoding procedure will now be described in more detail. The receiver end recognizes that the maximum transmission delay of the Audio 2 is set to 2 seconds from the HRBM message and FEC protection window of the Audio 2 is set to 1 second from the AL-FEC message, and stores source packets received over a broadband network in an FEC buffer. It also receives repair packets over a broadcast network and stores them in an FEC buffer. If the total number of received packets is 100 and more, it performs decoding using the repair packets received over the broadcast network to recover the not yet received source packets. The receiver end outputs the source packets received before 3 seconds from the start of the transmission of the respective source packets. Since the FEC protection window is 1 second and the maximum transmission delay of the Audio 2 is 2 seconds, at least 80 source packets are received and most of 20 or more repair packets transmitted over the broadcasting network are received in 3 seconds. Accordingly, receiving a total of 100 or more packets enables decoding. This may enable recovery of source packets (to arrive after 3 seconds) that have not yet been received.

Figure 10:
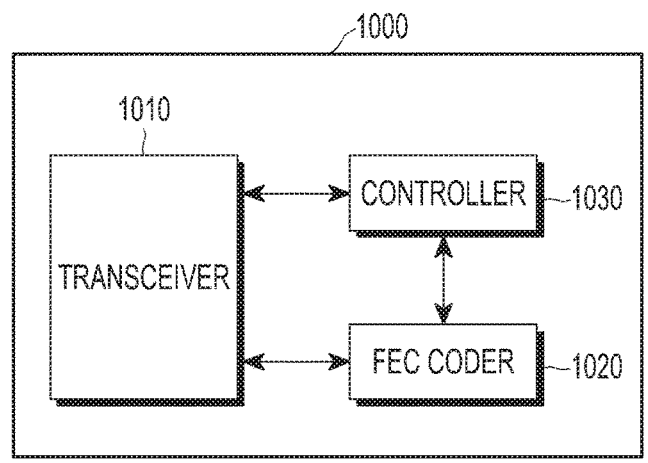
FIG. 10 is a schematic block diagram of a transmitting device, according to an embodiment of the present disclosure.

FIG. 10 is a schematic block diagram of a transmitting device, according to an embodiment of the present disclosure.

Referring to FIG. 10, the transmitting device 1000 includes a transceiver 1010, an FEC coder 1020, and a controller 1030. The controller 1030 determines the maximum transmission delays for source packet and repair packet of data for transmission and the number of repair packets based on conditions of networks over which the packets are to be transmitted, and transmits AL FEC message and HRBM message including the determined information to the transceiver 1010. It then generates source packets and repair packets of data for transmission and transmits them through the transceiver 1010 over a broadband network and a broadcasting network, respectively. The FEC coder 1020 applies FEC coding for packets to which FEC coding is applied.

Figure 11:
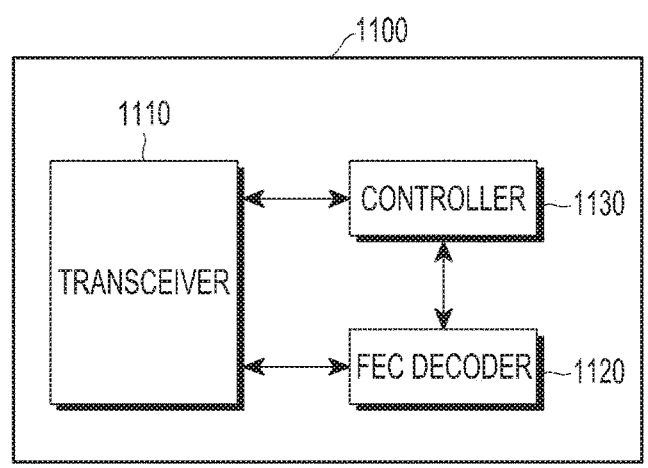
FIG. 11 is a schematic block diagram of a receiving device, according to an embodiment of the present disclosure.

FIG. 11 is a schematic block diagram of a receiving device, according to an embodiment of the present disclosure.

Referring to FIG. 11, a receiving device 1100 includes a transceiver 1110, an FEC decoder 1120, and a controller 1130. The controller 1130 receives service signaling or announcement through the transceiver 1110 and recognizes that Video 1, Audio 1, and Audio 2 are served from the transmitter end. It may obtain FEC configuration information and maximum transmission delay information for the Video 1, Audio 1, and Audio 2 based on an AL-FEC message and an HRBM message. The controller 1130 buffers source packets of the Audio 2 received over a broadband network and at the same time, buffers repair packets of the Audio 2 received over a broadcast network through the transceiver 1110. The controller 1130 receives source packets and repair packets for a corresponding period of time based on the maximum transmission delays for the source packet and the repair packet of the Audio 2 obtained in advance through the HRBM message, and regards that source packets that have not been received in the corresponding period of time are lost. Using the repair packets that have been completely received, the FEC decoder 1130 recovers the lost source packets and then decodes the recovered Audio 2 packets.

It will thus be understood that various modifications can be made without departing the scope of the present invention. Thus, it will be apparent to those ordinary skilled in the art that the disclosure is not limited to the embodiments described, but can encompass not only the appended claims but the equivalents. While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for transmitting packets in a broadcast and communication system, the method comprises:
   generating repair packets by encoding source packets with error correction codes, and
   transmitting the source packets over a first network and transmitting the repair packets over a second network,
   wherein the number of repair packets is determined based on a maximum transmission delay of the first network, and
   wherein a maximum transmission delay of the second network is smaller than the maximum transmission delay of the first network.

2. The method of claim 1, further comprising: transmitting maximum transmission delays and error correction configuration information of the source packets and repair packets before transmitting the source packets and the repair packets.

3. The method of claim 1, wherein the first network is a communication network, and the second network is a broadcasting network.

4. The method of claim 1,
   wherein for the source packets and the repair packets, an MPEG media transport (MMT) protocol is applied,
   wherein the maximum transmission delays of the source packet and the repair packet are transmitted in a hypothetical receiver buffer model (HRBM) message, and
   wherein the error correction configuration information is transmitted in an application layer forward error correction (AL-FEC) message.

5. A method for receiving packets in a broadcast and communication system, the method comprising:
   receiving service signaling,
   receiving source packets over a first network and receiving repair packets over a second network, and
   recovering and decoding the source packets using the repair packets,
   wherein the number of repair packets is determined based on a maximum transmission delay of the first network, and
   wherein a maximum transmission delay of the second network is smaller than the maximum transmission delay of the first network.

6. The method of claim 5, further comprising: receiving maximum transmission delays and error correction configuration information of the source packets and repair packets before receiving the source packets and the repair packets.

7. The method of claim 5, wherein the first network is a communication network, and the second network is a broadcasting network.

8. The method of claim 5,
   wherein for the source packets and the repair packets, an MPEG media transport (MMT) protocol is applied,
   wherein maximum transmission delays of the source packets and the repair packets are received in a hypothetical receiver buffer model (HRBM) message, and
   wherein the error correction configuration information is received in an application layer forward error correction (AL-FEC) message.

9. An apparatus for transmitting packets in a broadcast and communication system, the apparatus comprises:
   an error correction encoder configured to generate repair packets by encoding source packets with error correction codes;
   a transceiver configured to:
      transmit the source packets over a first network to a receiver, and
      transmit the repair packets over a second network to the receiver; and
   at least one processor configured to control the error correction encoder and the transceiver,
   wherein the number of repair packets is determined based on a maximum transmission delay of the first network, and
   wherein a maximum transmission delay of the second network is smaller than the maximum transmission delay of the first network.

10. The apparatus of claim 9, wherein the transceiver is further configured to transmit maximum transmission delays and error correction configuration information of the source packets and repair packets before transmitting the source packets and the repair packets.

11. The apparatus of claim 9, wherein the first network is a communication network, and the second network is a broadcasting network.

12. The apparatus of claim 9,
   wherein for the source packets and the repair packets, an MPEG media transport (MMT) protocol is applied,
   wherein the maximum transmission delays of the source packet and the repair packet are transmitted in a hypothetical receiver buffer model (HRBM) message, and
   wherein the error correction configuration information is transmitted in an application layer forward error correction (AL-FEC) message.

13. An apparatus for receiving packets in a broadcast and communication system, the apparatus comprising:
   a transceiver configured to:
      receive service signaling,
      receive source packets over a first network, and
      receive repair packets over a second network; and
   an error correction decoder configured to recover and decode the source packets using the repair packets,
   wherein the number of repair packets is determined based on a maximum transmission delay of the first network, and
   wherein a maximum transmission delay of the second network is smaller than the maximum transmission delay of the first network.

14. The apparatus of claim 13, wherein the transceiver is further configured to receive maximum transmission delays and error correction configuration information of the source packets and repair packets before receiving the source packets and the repair packets.

15. The apparatus of claim 13, wherein the first network is a communication network, and the second network is a broadcasting network.

16. The apparatus of claim 13,
wherein for the source packets and the repair packets, an MPEG media transport (MMT) protocol is applied,
wherein maximum transmission delays of the source packets and the repair packets are received in a hypothetical receiver buffer model (HRBM) message, and
wherein the error correction configuration information is received in an application layer forward error correction (AL-FEC) message.

* * * * *